(12) United States Patent
Gelinas

(10) Patent No.: US 11,013,213 B1
(45) Date of Patent: May 25, 2021

(54) PET FOOD DISPENSER

(71) Applicant: Lori Gelinas, Land O'Lakes, FL (US)

(72) Inventor: Lori Gelinas, Land O'Lakes, FL (US)

( * ) Notice: Subject to any disclaimer, the term of this patent is extended or adjusted under 35 U.S.C. 154(b) by 523 days.

(21) Appl. No.: 16/035,680

(22) Filed: Jul. 15, 2018

(51) Int. Cl.
*A01K 5/01* (2006.01)
*A01K 5/02* (2006.01)

(52) U.S. Cl.
CPC .......... *A01K 5/0114* (2013.01); *A01K 5/0291* (2013.01)

(58) Field of Classification Search
CPC .......... A01K 5/0114; A01K 7/00; A01K 5/00; A01K 5/0135; A01K 5/0291; B66F 11/00
USPC ............ 119/51.5, 51.01, 61.57, 61.56, 57.92
See application file for complete search history.

(56) References Cited

U.S. PATENT DOCUMENTS

| | | | | |
|---|---|---|---|---|
| 5,054,431 A * | 10/1991 | Coviello | .............. | A01K 5/0114 119/61.56 |
| 5,501,176 A * | 3/1996 | Tully | ................... | A01K 5/0114 119/61.57 |
| 5,584,263 A * | 12/1996 | Sexton | ................. | A01K 5/0114 119/51.5 |
| 8,082,883 B2 * | 12/2011 | Aletti | ..................... | B66F 11/00 119/61.57 |
| 8,479,686 B2 * | 7/2013 | Johnson | .................... | A01K 5/00 119/61.57 |
| 8,776,725 B1 * | 7/2014 | Grijalva | ............... | A01K 5/0114 119/61.57 |
| 9,144,225 B1 * | 9/2015 | Gaccione | ............. | A01K 5/0114 |
| 9,644,786 B2 * | 5/2017 | Steiner | ................... | F16M 11/24 |
| D800,396 S * | 10/2017 | Coviello | ....................... | D30/133 |
| 10,149,456 B2 * | 12/2018 | Diamond | ............. | A01K 5/0114 |
| 10,524,451 B1 * | 1/2020 | Sciortino | ............. | A01K 5/0135 |
| 10,548,294 B1 * | 2/2020 | Price | .................. | F16M 11/2092 |

* cited by examiner

*Primary Examiner* — Yvonne R Abbott-Lewis
(74) *Attorney, Agent, or Firm* — Gulf Coast Intellectual Property Group

(57) ABSTRACT

A pet food dispenser that includes two containers configured to receive and store pet food and/or water wherein the two containers are movable in a vertical direction. The pet food dispenser includes a housing having an upper portion and a lower portion wherein the upper portion includes an interior volume. Disposed in the interior volume of the upper portion is a drive assembly. The drive assembly includes a shaft, a drive pulley and a second pulley located at an opposing end of the shaft. A motor is operably coupled to the drive pulley and a belt operably couples the drive pulley and the second pulley. Container mounts are operably coupled to the shaft and the belt and are movable in conjunction with the directional movement of the belt. Support ring members are formed with the container mounts and are operable to receive and support the two containers.

11 Claims, 4 Drawing Sheets

PET FOOD DISPENSER

FIELD OF THE INVENTION

The present invention relates generally pet food containers, more specifically but not by way of limitation, a pet food dispenser that is configured to have at least two bowls wherein the present invention includes a housing and is configured to provide independent vertical travel of the bowls.

BACKGROUND

Millions of individuals own pets and as a results must engage in the regular care and feeding thereof. Common household pets are dogs and cats and these animals are feed on a routine basis. The feeding of the aforementioned types of pets is often conducted utilizing bowls. Bowls of various types and sizes are utilized to receive and provide access to the contents disposed therein which is most often food and water. It is quite common for a pet owner to be required to consistently refill a water bowl through the day. Additionally, the pet owner will provide food to the pet at least twice a day.

One issue presented during the feeding of the pet is access to the bowl for both the pet and the pet owner. Conventional pet bowls are typically kept on the floor so as to provide access for the pets once contents have been dispose therein. For some pet owners, the physical requirements for accessing a bowl on a floor can be challenging. Many pet owners have physical limitations that make even this simple task difficult. While some pet bowls are available in stands for larger pets to access the ability to retrieve the bowl so as to place contents therein can be a challenge. Additionally, some pets that are taller need to have a bowl provided to them at a level that provides an improved angle for consumption of the contents disposed therein. A taller dog has improved consumption and digestion if a bowl is place at a level that is higher than that of the floor.

Accordingly, there is a need for a pet food bowl that provides the ability for a user to place a food or water bowl at a level that is higher than that of the floor in order to facilitate an improved ability to access for either the pet owner or the pet.

SUMMARY OF THE INVENTION

It is the object of the present invention to provide a pet food dispenser that is configured to provide at least two containers wherein the pet food dispenser includes a housing that is manufactured from stainless steel.

Another object of the present invention is to provide a pet food dispenser that is configured to provide at least two containers wherein the containers are vertically adjustable wherein the housing includes an interior volume operable to house a drive assembly therein.

A further object of the present invention is to provide a pet food dispenser that is configured to provide at least two containers wherein the drive assembly is operably coupled to the at least two containers and provide vertical movement thereof.

Still another object of the present invention is to provide a pet food dispenser that is configured to provide at least two containers wherein the containers are vertically adjustable wherein the drive assembly includes a drive rod for each container and further has pulleys operably coupled at the ends thereof.

An additional object of the present invention is to provide a pet food dispenser that is configured to provide at least two containers wherein the drive assembly includes low voltage direct current motors.

Yet a further object of the present invention is to provide a pet food dispenser that is configured to provide at least two containers and provide vertical movement thereof wherein the drive assembly operation is controlled by a first technique and a second technique.

Another object of the present invention is to provide a pet food dispenser that is configured to provide at least two containers wherein the at least two containers are operably coupled to the drive assembly utilizing ring members.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
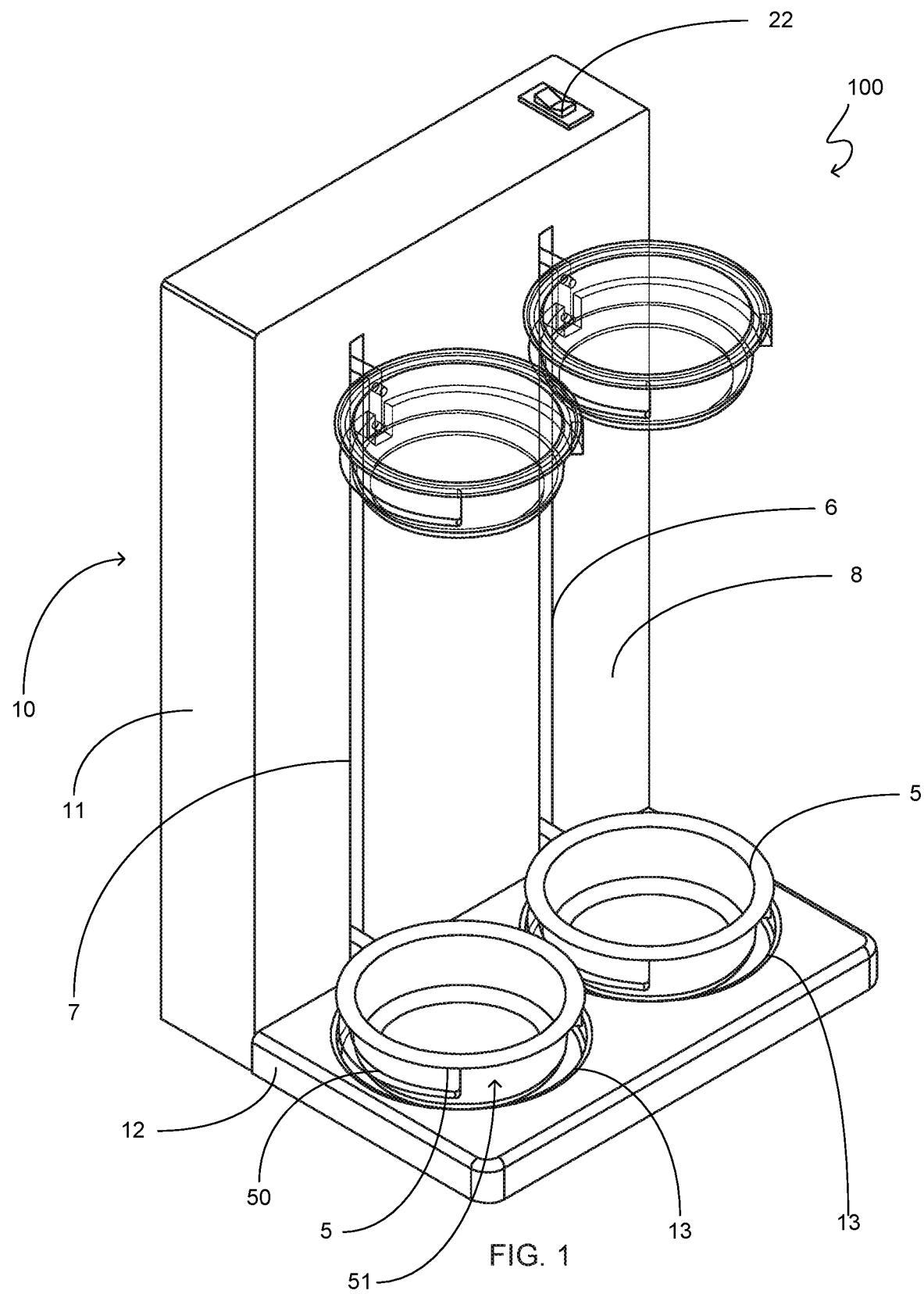
FIG. 1 is a perspective view of the present invention.
Figure 2:
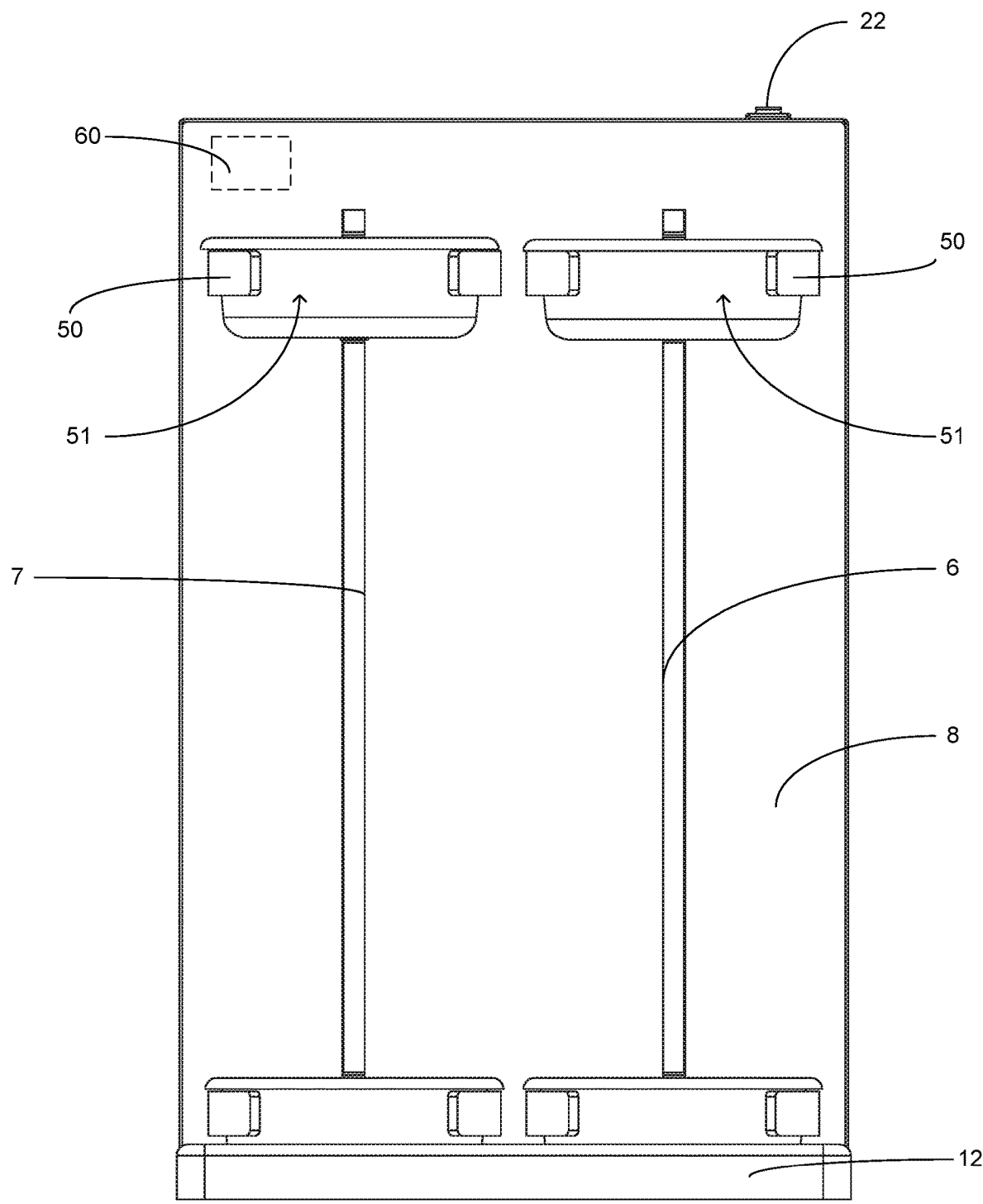
FIG. 2 is a front view of the present invention.

Referring now to the drawings submitted herewith, wherein various elements depicted therein are not necessarily drawn to scale and wherein through the views and figures like elements are referenced with identical reference numerals, there is illustrated a pet food dispenser 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1 herein, the pet food dispenser 100 includes a housing 10. The housing 10 includes an upper portion 11 and a lower portion 12 integrally formed utilizing suitable durable techniques. The upper portion 11 is perpendicular to the lower portion 12 and extends upward therefrom. The lower portion 12 is designed to be superposed on a floor or other suitable support surface. The housing 10 is manufactured from a material such as but not limited to stainless steel. It is desired within the scope of the present invention that the housing 10 is manufactured from a rigid bacteria resistant material. While the upper portion 11 is illustrated as being rectangular in shape, it is contemplated within the scope of the present invention that the upper portion 11 could be formed in alternate shapes. The lower portion 12 includes recesses 13 that are designed to receive a portion of the containers 5 therein. The recesses 13 function to provide improved retention of the containers 5 during use thereof in a feeding position that places the containers 5 superposed the top surface 9 of the lower portion 12. It is contemplated within the scope of the present invention that the recesses 13 are mateably shaped to be of the same shape as the containers 5 and could be formed in any shape so as to mateable with the containers 5.

The upper portion 11 of the housing 10 includes front wall 8. Front wall 8 includes a first slot 7 and second slot 6 formed therein. The first slot 7 and second slot 8 permit the outward protrusion of the container mounts 20 and further allow for the vertical travel thereof. It is contemplated within the scope of the present invention that the front wall 8 could have more or less than two slots based on the quantity of containers 5. It should be understood within the scope of the present invention that the pet food dispenser 100 could have as few as one container 5 or more than two containers 5. Securely mounted to the housing 10 is switch 22. Switch 22 provides a first operational technique of the pet food dispenser 100. The switch 22 is electrically coupled to the drive assembly 30 as will be further discussed herein. The switch 22 provides an interface for a user to move the containers 5 in an upward-downward position as desired so as to locate the containers 5 in a preferred position. While the switch 22 could be configured as various types of electrical switches, good results have been achieved utilizing a momentary contact switch for the switch 22.

Figure 3:
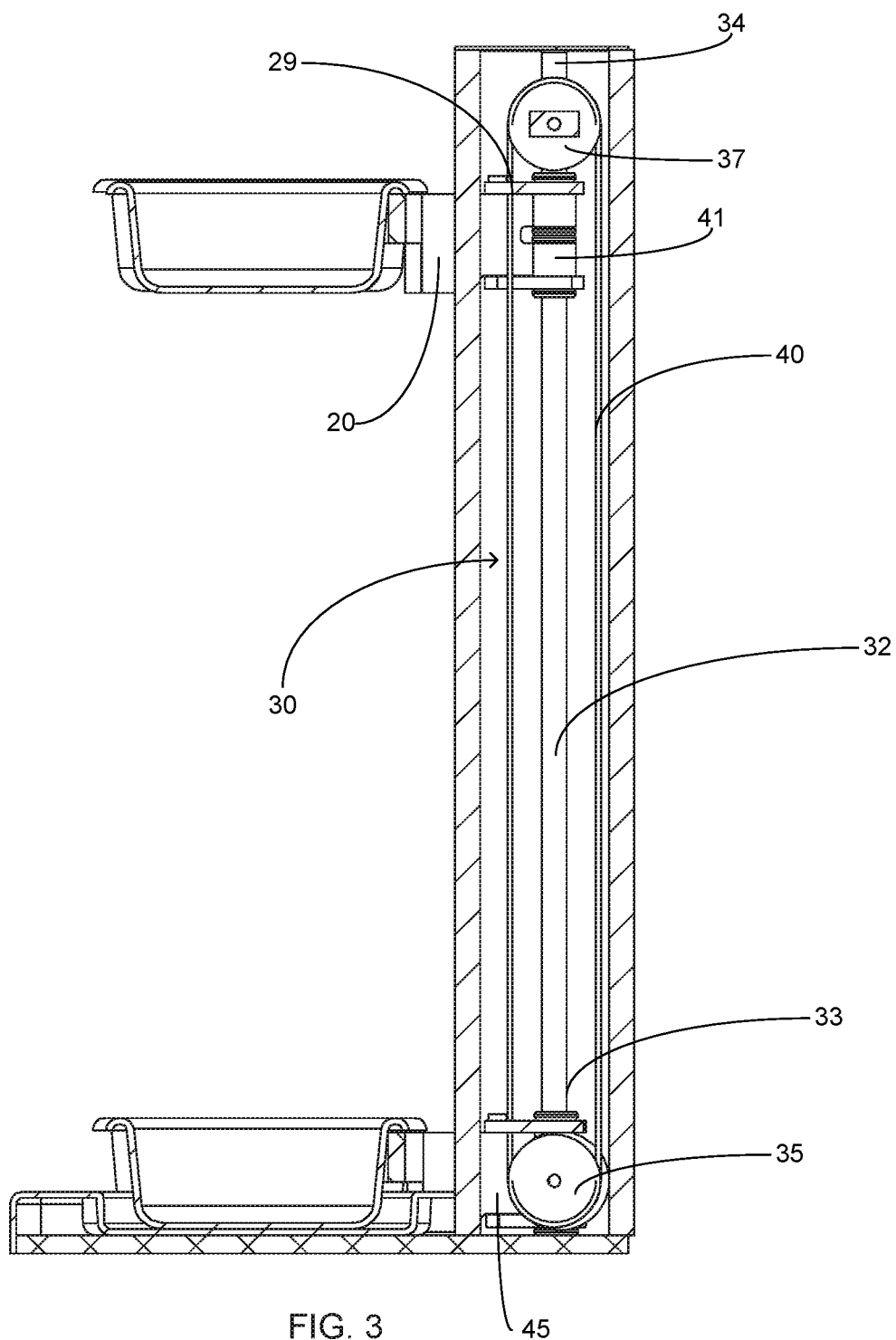
FIG. 3 is cross-sectional side view of the present invention.
Figure 4:
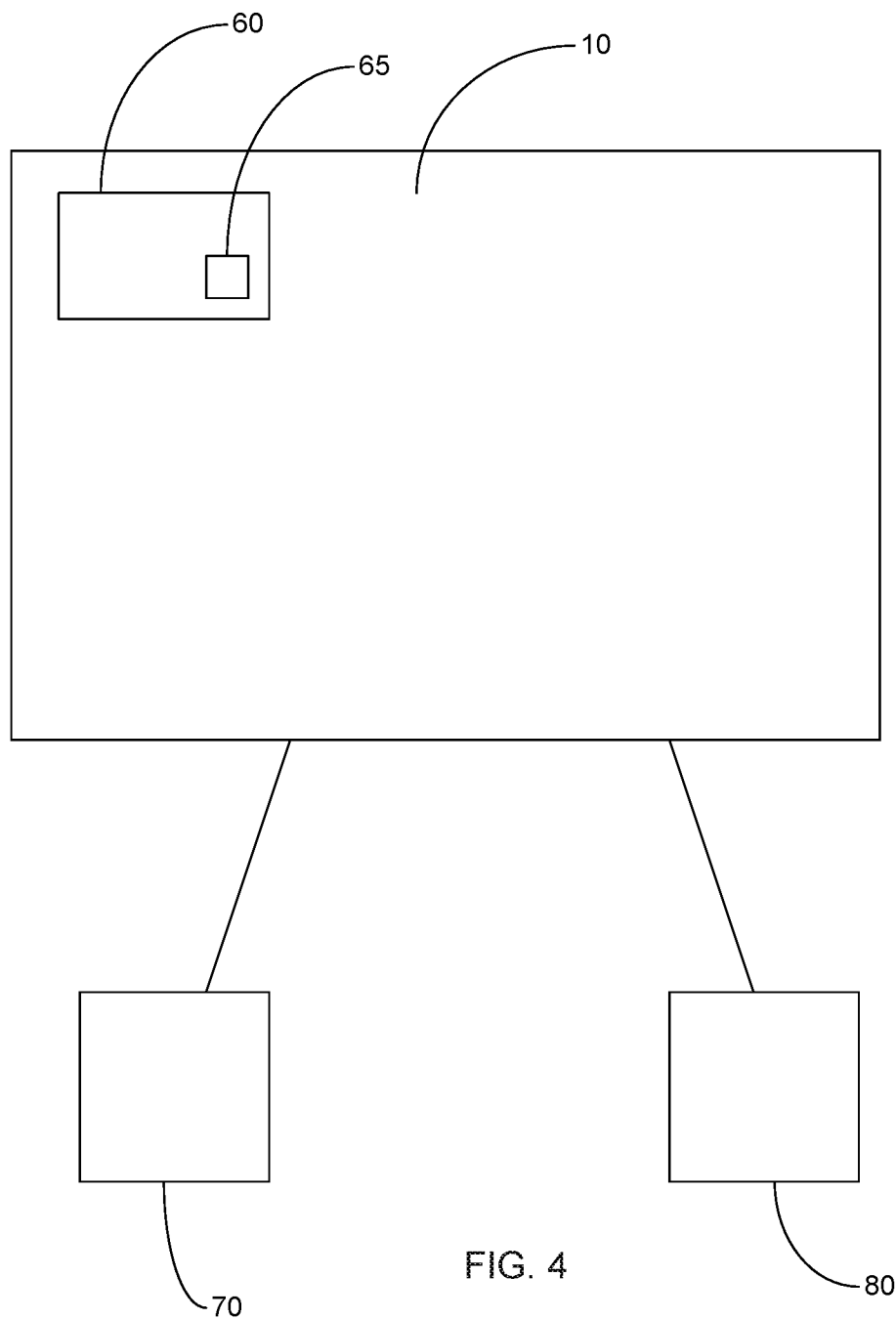
FIG. 4 is a diagrammatic view of the second technique of drive assembly operation.

Referring in particular the FIG. 3 herein, a view of the drive assembly 30 is illustrated therein. The drive assembly 30 is operable to provide vertical movement in an upwards-downwards direction of the containers 5. The drive assembly 30 includes shaft 32 having a first end 33 and second end 34. The shaft 30 provides a technique to operably couple the container mounts 20 and provide axial movement thereof. The shaft 30 includes drive pulley 35 proximate the first end 33 and the second pulley 37 proximate the second end 34. A belt 40 is operably intermediate the drive pulley 35 and the second pulley 37 and is configured to be moved thereby during rotation of the drive pulley 35. The container mounts 20 include coupling 29 that is operably engaged with the belt 40. It should be understood within the scope of the present invention that the quantity of shafts 32, belts 40, drive pulley 35 and second pulley 37 are directly correlated to the quantity of containers 5 for the pet food dispenser 100. Each of the aforementioned are provided for each container 5. By way of example but not limitation, if the pet food dispenser 100 had four containers 5 then a quantity of four of the aforementioned would be present in order to facilitate independent operation of each. The coupling 29 serves to provide engagement with the belt such that the containers mounts 20 will traverse in the same direction as the movement of the belt 40. The drive pulley 35 is operated by a motor 45, which is a conventional low voltage direct current motor. The motor 45 is operable to rotate the drive pulley 35 in a clockwise or counterclockwise rotation and as such provide a first direction and a second direction of the belt 40. The aforementioned movement of the drive pulley 35 and belt 40 provides the vertical upwards-downwards travel of the containers 5. Bushing 41 is integrally formed with coupling 29 and is configured to be surroundably mounted to the shaft 32. The surroundable mounting of the bushing 41 to the shaft 32 provides smooth slidable operation and further is configured to as to accommodate the weight of the contents disposed in the containers 5. The container mounts 20 include a support ring 50 operably coupled thereto. Support ring 50 is manufactured from a durable rigid material and is formed in a shape so as to receive and support container 5. The support ring 50 is semicircular in shape so as to provide ease of removal and placement of the container 5 therein. While no particular shape of the support ring 50 is required, a support ring 50 having a formed shape covering between two hundred degrees and three hundred degrees provides sufficient support for a superposed container 5 while allowing a void 51 for access to the container 5. It is contemplated within the scope of the present invention that the support ring 50 could be formed in additional shapes as opposed to the semi-annular shape illustrated herein. The support ring 50 can be formed in alternate shapes so as to mateably couple with the containers 50.

Disposed within the housing 10 is controller 60. The controller 60 is electrically coupled to the drive assembly 30 and is configured to provide a second technique of operation of the pet food dispenser 100. The controller 60 includes electronics that are operable to receive, store, transmit and manipulate data. Controller 60 further includes a receiver 65 that is operable to receive an electronic signal from transmitters 70,80. The transmitters 70,80 and the controller 60 are wirelessly coupled utilizing a suitable frequency such as but not limited to RFID. The transmitters 70,80 are detected subsequent being proximate the pet food dispenser 100 and upon detection thereof by the receiver 65, the controller 60 will initiate movement of at least one of the containers to a programmed position. By way of example but not limitation, if a user desires to have a container 5 at the highest vertical position for placing contents therein, as the user approaches the pet food dispenser 100 and is in possession of a transmitter 70,80 the container 5 will be moved to the programmed position. The transmitters 70,80 are provided in various forms such as but not limited to a key fob for easy transportation by a user. It is contemplated within the scope of the present invention that numerous key fobs could be provided and wherein each key fob is paired with a specific container 5 in order to allow for independent control thereof. It is also contemplated within the scope of the present invention that additional transmitters 70,80 could be embedded into conventional pet collars wherein the height of the container 5 could be programmed for each pet so when a pet approaches the pet food dispenser 100 at least one of the containers 5 is placed at an optimum height for the pet to more easily consume contents disposed therein.

The pet food dispenser 100 is powered by a conventional power supply that is electrically coupled to a standard one hundred and twenty volt receptacle. It is further contemplated within the scope of the present invention that the pet food dispenser 100 could be powered with batteries in addition to and/or in conjunction with electrical coupling to a power source. It is further contemplated within the scope of the present invention that the housing 10 could be provided in various height and width dimensions and in numerous colors to accommodate various decors within a residence. Additionally, while a drive assembly 30 of a particular configuration has been disclosed herein, it is contemplated within the scope of the present invention that the drive assembly 30 could utilize alternate mechanical components in order to facilitate the desired vertical upwards-downwards movement of the containers 5.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A pet food dispenser comprising:
   a housing, said housing having a plurality of walls, a top and a bottom forming an interior volume, said housing having a front wall, wherein said front wall of said housing further includes a slot, said slot being vertically formed in said front wall, said housing being manufactured from a rigid material;
   a drive assembly, said drive assembly being disposed within said interior volume of said housing, said drive assembly including at least one motor;
   at least one container, said at least one container being operably coupled to said drive assembly, said at least one container being adjacent said front wall of said housing, said at least one container being movable with respect to said housing in an upward-downward direction;
   at least one container mount, said at least one container mount being operably coupled to said drive assembly, said at least one container mounted having a portion thereof extending through said slot;
   a controller, said controller being disposed within said interior volume of said housing, said controller configured to provide the second technique of operation of the pet food dispenser;
   at least one transmitter, said at least one transmitter being wirelessly coupled with said controller, said at least one transmitter configured to provide movement of the at least one container ensuing detection by said controller;
   at least one support ring, said at least one support ring operably coupled to said at least one container mount, said at least one support ring configured to receive and retain said at least one container; and
   wherein the pet food dispenser includes a first technique and a second technique for providing movement of the at least one container, wherein said first technique includes utilization of a switch, said switch being mounted to said housing, said switch being electrically coupled to said drive assembly, said switch operable to activate said drive assembly so as to provide movement of said at least one container.

2. A pet food dispenser that includes a plurality of containers for serving pet food wherein the containers are positionable at various heights comprising:
   a housing, said housing having a plurality of walls, a top and a bottom forming an interior volume, said housing having a front wall, said housing being manufactured from a rigid material, said housing having an upper portion and a lower portion, said upper portion and said lower portion being integrally formed, said upper portion of said housing having an interior volume;
   a drive assembly, said drive assembly being disposed within said interior volume of said upper portion of housing, said drive assembly further including at least one shaft, said at least one shaft having a first end and a second end, said at least one shaft being vertically oriented within said interior volume of said upper portion of said housing, said drive assembly further including a drive pulley, said drive pulley being operably coupled to said at least one shaft, wherein said at least one shaft further includes a second pulley, said second pulley being operably coupled to said drive pulley distally located on said at least one shaft, said second pulley and said drive pulley being operably coupled with a belt;
   a plurality of containers, said plurality of containers being operably coupled to said drive assembly, said plurality of containers being adjacent said front wall of said housing, said plurality of containers being movable in an upward-downward direction;
   a receiver, said receiver being operably integrated with said controller, said receiver configured to receive wireless signals;
   a plurality of transmitters, said plurality of transmitters wirelessly coupled to said receiver, said second technique of operation of the pet food dispenser being controlled by said plurality of transmitters and said receiver;
   a controller, said controller being disposed within said interior volume of said upper portion of said housing, said controller having the necessary electronics to store, receive, transmit and manipulate data; and
   wherein the pet food dispenser includes a first technique and a second technique for providing movement of the plurality of containers.

3. The pet food dispenser as recited in claim 2, wherein said lower portion of said housing is perpendicularly oriented with said upper portion, said lower portion of said housing configured to be superposed a support surface.

4. The pet food dispenser as recited in claim 3, and further including a switch, said switch being mounted to said upper portion of said housing, said switch being electrically coupled to said drive assembly, said switch operable to activate said drive assembly so as to provide movement of said plurality of containers, said switch providing said first technique of operation of the pet food dispenser.

5. The pet food dispenser as recited in claim 4, and further including a plurality of support ring members, said plurality of support ring members being semi-circular in shape, said plurality of support ring members configured to receive and support said plurality of containers, said plurality of support ring members being operably coupled to said drive assembly.

6. A pet food dispenser configured with at least two containers wherein the at least two containers are vertically movable comprising:
   a housing, said housing having a plurality of walls, a top and a bottom forming an interior volume, said housing having a front wall, said housing being manufactured from a rigid material, said housing having an upper portion and a lower portion, said upper portion and said lower portion being integrally formed, said upper portion of said housing having an interior volume, said upper portion having a front wall, said front wall of said upper portion of said housing having at least two slots formed therein, wherein the at least two slots are vertical in orientation;
   a drive assembly, said drive assembly being disposed within said interior volume of said upper portion of housing, said drive assembly further including at least two shafts, said at least two shafts having a first end and a second end, said at least two shafts being vertically oriented within said interior volume of said upper portion of said housing, said drive assembly further including at least two drive pulleys, said at least two drive pulleys being operably coupled to said at least two shafts proximate said first end thereof, said drive assembly further including at least two second pulleys, said at least two second pulleys being proximate said second end of said at least two shafts, said at least two second pulleys and said at least two drive pulleys being operably coupled with at least two belts wherein a drive pulley and a second pulley coupled to a same shaft are operably coupled by a belt, said at least two drive pulleys being operably coupled to a motor, said motor configured to provide rotation of said at least two drive pulley;
   at least two container mounts, said at least two container mounts being operably coupled to said belt of said drive assembly, said at least two container mounts being slidably coupled to said at least one shaft, said at least two container mounts having a portion extending through said at least two slots of said front wall of said upper portion of said housing;
   at least two containers, said at least two containers being operably coupled to said at least two belts of said drive assembly, said at least two containers being adjacent said front wall of said housing, said at least two containers being movable in an upward-downward direction;
   a controller, said controller being disposed within said interior volume of said upper portion of said housing, said controller having the necessary electronics to store, receive, transmit and manipulate data;
   at least two transmitters, said at least two transmitters being wirelessly coupled to said controller; and
   wherein the pet food dispenser includes a first technique and a second technique for providing movement of the plurality of containers.

7. The pet food dispenser as recited in claim 6, wherein said lower portion of said housing further includes a top surface, said top surface of said lower portion having at least two recesses formed therein, said at least two recesses configured to mateable couple with a portion of said at least two containers.

8. The pet food dispenser as recited in claim 7, and further including at least two support ring members, said at least two support ring members being semi-circular in shape, said at least two support ring members being operably coupled to said at least two shafts, said at least support ring members being formed to have a shape between two hundred and three hundred degrees.

9. The pet food dispenser as recited in claim 8, and further including a switch, said switch being mounted to said upper portion of said housing, said switch being electrically coupled to said drive assembly, said switch operable to activate said drive assembly so as to provide movement of said at least two containers, said switch providing said first technique of operation of the pet food dispenser.

10. The pet food dispenser as recited in claim 9, wherein said at least two transmitters are operably coupled to a receiver within said controller, said at least two transmitters and said receiver providing the second technique of operation of the pet food dispenser ensuing said at least two transmitters being proximate said receiver.

11. The pet food dispenser as recited in claim 10, wherein said housing is manufactured from stainless steel.

\* \* \* \* \*